Dec. 8, 1953  A. I. BEAN  2,661,542
APPARATUS FOR MEASURING BACKLASH IN GEARS
Filed April 4, 1946  4 Sheets-Sheet 1
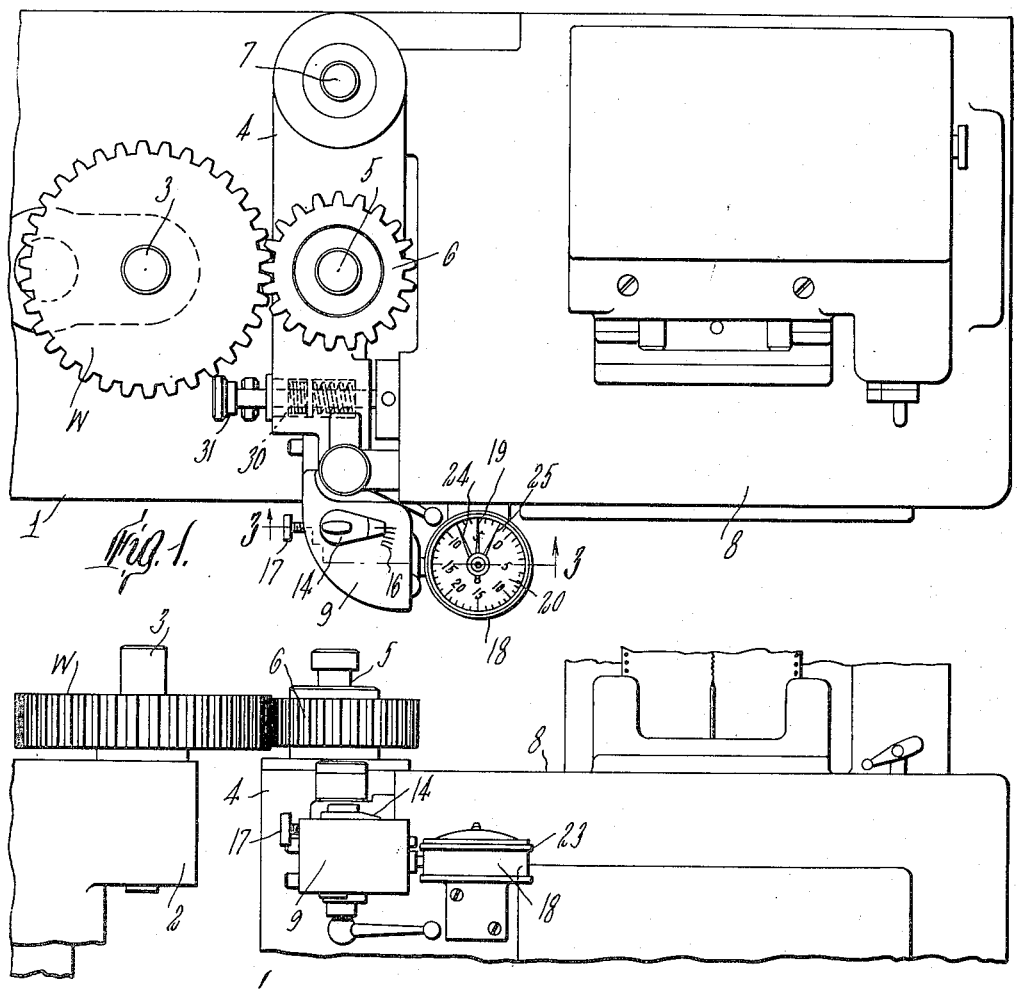
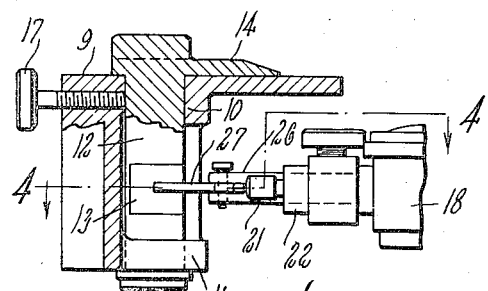
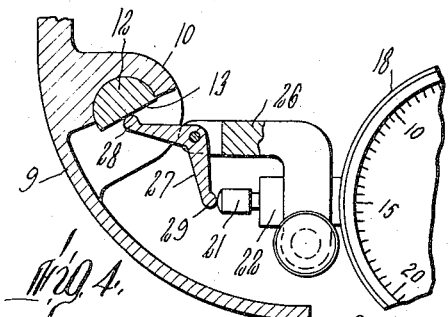
Inventor
Arthur I. Bean Dec. 8, 1953 A. I. BEAN 2,661,542
APPARATUS FOR MEASURING BACKLASH IN GEARS
Filed April 4, 1946 4 Sheets-Sheet 3
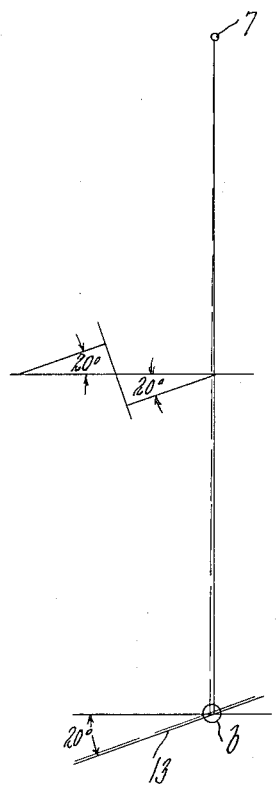
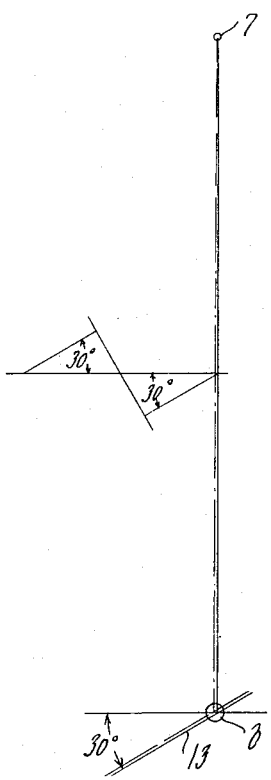
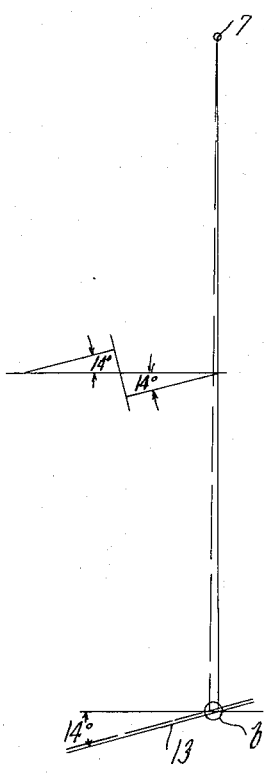
Fig. 8. Fig. 9. Fig. 10.
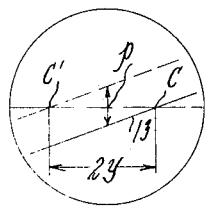
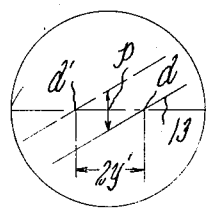
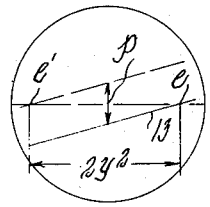
Fig. 11. Fig. 12. Fig. 13.
Inventor
Arthur I. Bean
by Wright, Brown, Quinby & May
Attys.

Patented Dec. 8, 1953

2,661,542

UNITED STATES PATENT OFFICE 2,661,542

APPARATUS FOR MEASURING BACKLASH IN GEARS

Arthur I. Bean, Springfield, Vt., assignor to The Fellows Gear Shaper Company, Springfield, Vt., a corporation of Vermont Application April 4, 1946, Serial No. 659,524

9 Claims. (Cl. 33—179.5)

The object of this invention is to provide a simple and accurate apparatus for determining whether or not the backlash of gears produced for any purpose is within prescribed limits of tolerance, and also for measuring to close limits of accuracy the actual backlash of any particular gear.

Devices or apparatus in which this invention is embodied are based on the principle that the distance between the centers of meshing gears is greater or less according as the backlash of either gear or both gears is greater or less, and that the pressure angle of the gear teeth is a factor which governs the difference of center distance between gears having no backlash and those having a given amount of backlash.

In putting this invention into practice I have utilized means for mounting a test gear in mesh with a master gear with provisions for movement of one gear toward and away from the other and a measuring or indicating means operable in consequence of such relative movement through transmission means adjustable to conform with the pressure angle of the test gear.

The invention is explained in the following specification with reference to concrete embodiments shown in the accompanying drawings, in which—

Fig. 1 is a plan view of a measuring apparatus showing one embodiment of the invention;

Fig. 2 is a front elevation of the apparatus shown in Fig. 1, omitting the base by which the parts thereof are supported;

Fig. 3 is a detail sectional view taken on line 3—3 of Fig. 1 shown on an enlarged scale;

Fig. 4 is a transverse sectional view taken on line 4—4 of Fig. 3;

Figure 14:
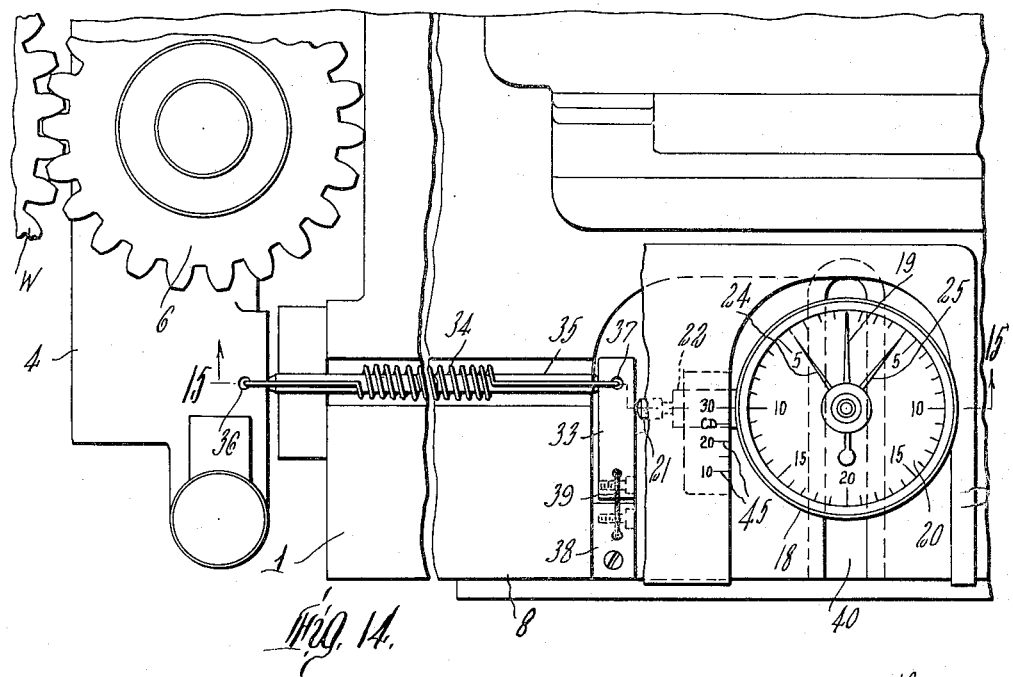
Figure 15:
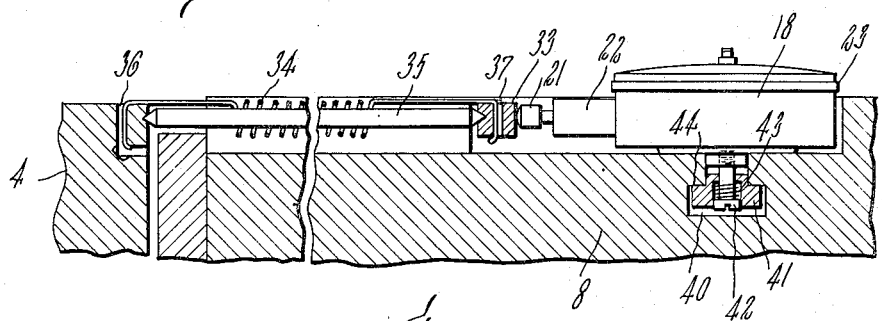

Figs. 5-13 inclusive are diagrammatic views showing the principles according to which the desired results are obtained by the use of this apparatus;

Fig. 14 is a plan view of a modified form of measuring machine embodying the same principles;

Fig. 15 is a sectional view taken on line 15—15 of Fig. 14.

Like reference characters designate the same parts wherever they occur in all the figures.

The machine shown in Figs. 1-4 has a base 1 which supports a fixture 2 carrying a stud 3 on which the gear to be tested is mounted rotatably. Such a gear is here designated by the letter W.

The base supports also a holder 4 carrying a pivot stud 5 on which a master gear 6 may be mounted rotatably in mesh with the gear to be tested. The holder 4 is mounted to turn on a pivot stud 7 held by a carriage 8, which is adjustable on the base 1 to move in directions toward and away from the fixture 2. By means of such adjustment the master gear can be brought into mesh with test gears of different diameters. Also the fixture 2 can be removed and substituted by other fixtures for holding various types of gear, internal as well as external gears.

There is mounted on the end of the holder 4 remote from the pivot 7, that is, at the opposite side of the master gear pivot from the holder pivot, a bracket 9 having bearings 10 and 11 (Fig. 3), in which a shaft 12 is rotatably mounted. This shaft has a cam face 13 which, due to the long distance at which it is situated from pivot 7, is approximately flat; but it may be curved suitably to compensate for its arcuate path, in transmitting motion to indicating means later described. The shaft also carries an indicator arm or index 14 overlying the upper surface of the bracket 9 and serving in conjunction with an angle scale 16 on the top of the bracket, to incline the face 13 at definite prescribed inclinations to the common plane of the pivot 7 and shaft 12. A set screw 17 is mounted in the side of bracket 9 in position to bear on the shaft 12 and secure it in any position of angular adjustment.

Shaft 12 is called for the purpose of this description the conversion shaft. It is made angularly adjustable to correspond with the pressure angles of different test gears, and preferably the graduations 16 are designated by numerals or other symbols to indicate pressure angles for which the conversion shaft may be adjusted.

Mounted on the carriage 8 is a micrometer indicator 18 having a pointer 19 movable rotatably over a graduated dial 20, shown in Fig. 1, and a plunger 21, movable endwise through a guide sleeve 22, which operates multiplying mechanism in the casing of the indicator to impart movement to the pointer 19. The instrument here shown is one of a well known and commonly used type in which movement of the plunger is multiplied by a factor of 150 at the extremity of the pointer. The dial 20 is mounted on the casing of the instrument by a bezel 23 whereby the dial can be turned independently around the axis of the pointer 19. There are also adjustable stationary pointers 24 and 25 rotatable around the axis of the pointer 19, the purpose of which is to indicate tolerance limits for movements of the pointer 19.

Guide sleeve 22 is secured to the side of the indicator casing. A bracket 26 is secured to this sleeve and supports a bell crank lever 27, of which one arm extremity 28 is located to bear on the cam face 13 of the conversion shaft and the other arm extremity 29 is located to bear on the end of plunger 21. A spring in the indicator casing acts on the plunger 21 tending to hold it at the outer limit of its movement. This spring keeps the plunger in contact with the bell crank lever 27 and the latter in contact with the conversion shaft 12. The spring means 30, shown by dotted lines in Fig. 1, are mounted in the holder 4 to cooperate with a screw 31 to exert pressure on the holder either toward or away from the test gear according to adjustments of the screw. For testing external gears, the spring means are set to exert force on the gear 6 toward the test gear (to the left with respect to these drawings); and when an internal gear is to be tested, the spring means are set to exert force in the opposite direction.

In order to test a gear for backlash, an accurate master gear 6 is mounted on the pivot 5 of the holder 4, a master gear having the same diameter and pitch as the gears to be tested and having a known backlash is mounted on the work holder fixture 2, the carriage 8 is advanced to bring the master gears into mesh and put the holder 4 in an intermediate position from which it can be moved in one direction against the pressure of the spring means 30, and in the opposite direction by the spring, a distance in either direction greater than the permissible backlash of the gears to be tested, the conversion shaft is set with the index mark of its pointer 14 in register with that one of the graduations 16 which corresponds to the pressure angle of such gears, the dial 20 of the indicator is turned so that the graduation thereon which designates the known backlash of the master work gear registers with the pointer 19, and the tolerance pointers 24 and 25 are set to the graduations of the dial which designate the tolerable limits of backlash. Then the master work gear is removed from the fixture 2, the gear W to be tested is mounted on the fixture in mesh with the master gear 6, the gears are rotated and the movements of the pointer 19 are noted.

The instrument now being described is designed to permit measurement of backlash by direct reading on the indicator dial 20, without applying any correction factor, wherefore the conversion shaft 12 is so located that the intersection of the cam face 13 with a selected radius from the holder pivot 7 is at twice the distance of the axis of pivot 5 from the axis of pivot 7 when the conversion shaft is adjusted to a prescribed angle. Since the backlash of a gear tooth is equally divided between opposite sides of the tooth, the change of center distance between the test gear and the master gear due to a difference of backlash is proportional to half the backlash, wherefore the factor of 2 applied to the movement of the conversion shaft due to the ratio between the distances of the cam face of this shaft and the master gear center from the holder pivot, causes the displacement of the conversion shaft to be a direct measure of the total backlash. And when the conversion shaft is adjusted to bring its cam face 13 at an angle to the direction of its movement equal to the pressure angle of the test gear, the movement transmitted to the plunger 21 of the indicator is equal to the backlash; the arms of the bell crank being so proportioned and located that they transmit movement to the plunger 21 equal to the displacement of the contact point 28 of the bell crank in the direction perpendicular to the direction of movement of the conversion shaft, within their limited range of movement.

Figure 5:
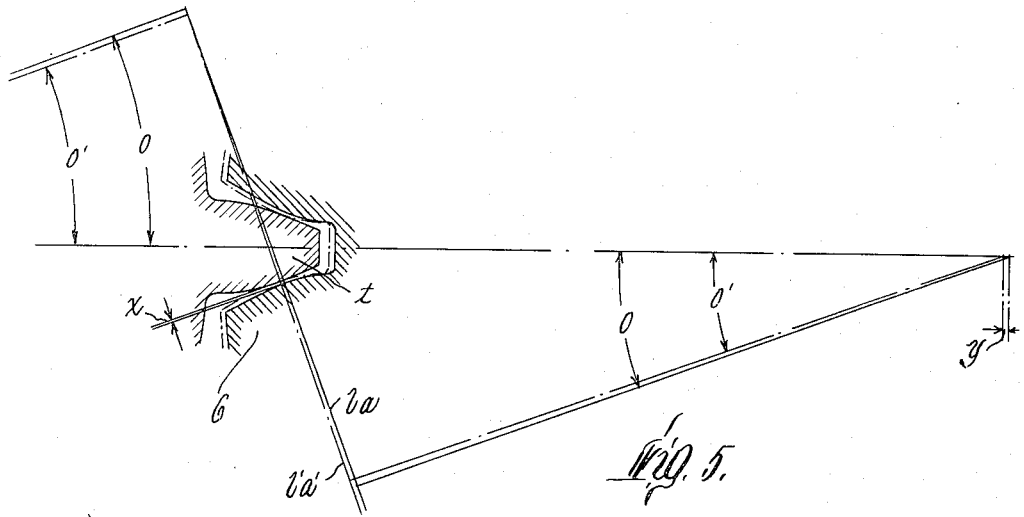
Figure 6:
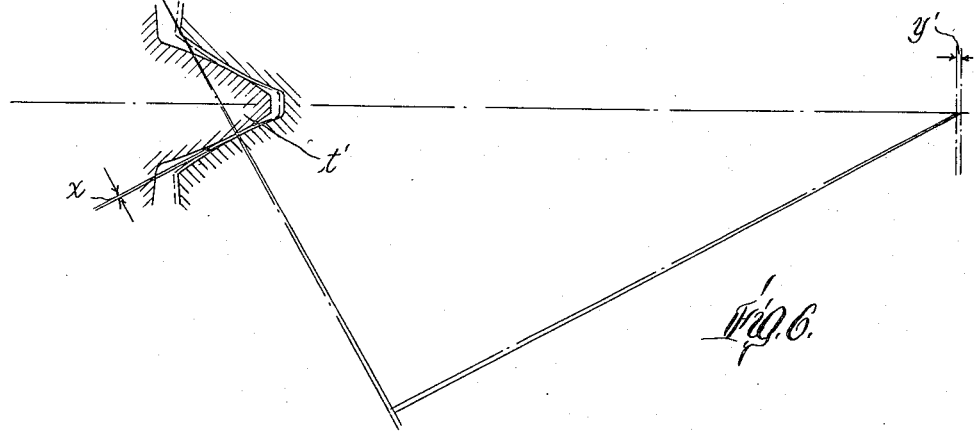
Figure 7:
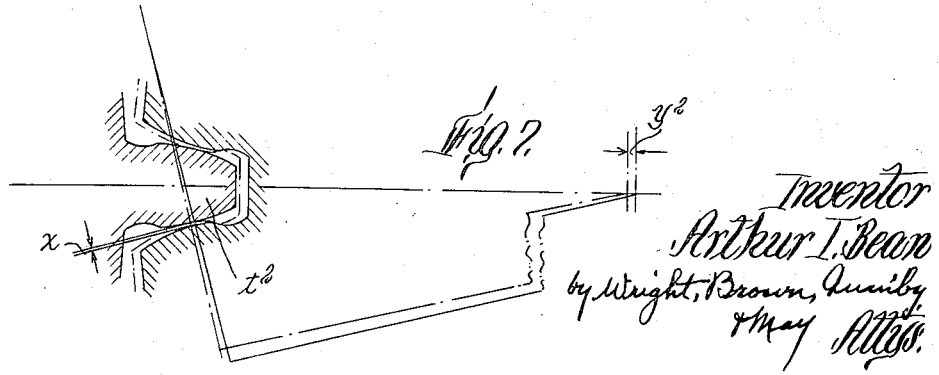

Attention is directed to Figs. 5, 6 and 7 for demonstration of the principles last described. A tooth $t$ of a test gear having a pressure angle of 20° is shown in Fig. 5 between two teeth of the master gear 6. The full lines and broken lines designating the master gear teeth represent different positions of the master gear when meshing with test gear teeth of maximum and minimum backlash. This designates with exaggeration that there may be different amounts of backlash in teeth of the same gear. The dimension $x$ designates the distance measured on the line of action which corresponds to half the extreme difference of backlash (measured on the pitch circle) and the dimension $y$ designates the shifting of the center of the master gear when it meshes with the teeth of greatest and least backlash. Due to the change of center distance, the line of action of the teeth varies between the extremes designated by the lines $ta$ and $t'a'$, respectively, and the actual pressure angles vary between the angles designated $o$ and $o'$.

Fig. 6 shows similar conditions with respect to a test gear tooth $t'$ having a pressure angle of 30° and of which the variation of backlash is the same as in the gear previously described, but the change of center distance $y'$ is less, due to the fact that the pressure angle is greater. The same things are shown by Fig. 7 with respect to a tooth $t^2$ of a 14° pressure angle gear having the same backlash variation as the gears precedently mentioned. The shift of the master gear center designated $y^2$ is greater than in the other cases.

Figs. 8, 9 and 10 show in a diagrammatic way, and with exaggeration, the shifting of the master gear holder about its pivot 7 due to shifting of the master gear center through the distances $y$, $y'$ and $y^2$, with gears having pressure angles of 20°, 30° and 14°, respectively. The reference character 13 in Figs. 8, 9 and 10 designates a plane corresponding to the surface 13 on the conversion shaft, and the full and broken lines to which this character is applied indicate, with exaggeration, the extreme positions of the surface 13 occasioned by the rotation of the gears with varying backlash precedently referred to. Figs. 11, 12 and 13 show on a much enlarged scale so much of the diagrams of Figs. 8, 9 and 10 as are enclosed within the circles $b$. A given point on the surface 13 shifts between locations $c$ and $c'$ in Fig. 11 when the center of the master gear is moved through the distance $y$; the same point may shift between locations $d$ and $d'$ shown in Fig. 12 when the master gear center is moved the distance $y'$; and a point on the surface 13 may move between the locations $e$ and $e'$ when the displacement of the master gear center is the distance $y^2$. The displacements thus indicated correspond to those due to the same amount of backlash in the test gears represented in Figs. 5, 6 and 7. But a follower bearing on the surface 13 and constrained to move in a path perpendicular, or substantially so, to the travel of the conversion shaft (the path of its bearing point being designated $p$ in Figs. 11, 12 and 13), is displaced an equal distance in each instance if the surface 13 is set at an angle to its path of movement equal to the pressure angle of the gear. It is demonstrable mathematically and graphically that, with the arrangement and proportions here shown, and with a suitable cam surface 13, the distance by which the plunger of the indicator instrument is moved in consequence of backlash variations, is equal to the amount of backlash.

Instead of using the apparatus to indicate whether or not the backlash of a gear is within permissible limits, the change in center distance between the master gear and test gear can be read directly by setting the parts as follows. A master work gear is mounted on the work holder and meshed with the master gear 6 as previously described, the conversion shaft 12 is turned to incline the cam surface 13, with respect to its directions of movement, at an angle of which the tangent is equal to the ratio between the axial distance of pivot 7 to pivot 5 and the distance from pivot axis 7 to a prescribed point on face 13, and the indicator dial is turned to bring its zero in register with the pointer 19. The above mentioned adjustment point for the conversion shaft is designated by an indication on the scale 16. Then, when the test gear is substituted for the master work gear on spindle 3, and rotated, the center distance variation is shown and measured directly by the pointer 19 and scale 20.

A variation of the apparatus previously described is shown in Figs. 14 and 15. In this case the pivoted master gear holder 4 is connected with an arm 33 by means of a spring 34, and a fixed distance is maintained between the holder 4 and arm 33, at the points where the spring is connected with them, by a distance rod 35 having conical ends seated in conical sockets in the holder 4 and arm 33. The cone angle of the sockets is larger than the cone angle of the rod ends, whereby a frictionless bearing is provided. The spring is coiled into a helix and has hook ends anchored in sockets 36 and 37 of the holder and arm, respectively. The arm is mounted on the carriage 8 by means of a block 38, secured to the carriage, to which the arm is connected by a leaf spring 39, which is clamped at one end in the block 38 and at the other end in the contiguous end of arm 33. The spring provides a frictionless fulcrum about which the arm 33 can swing pursuant to movements imparted from the holder 4.

An indicator 18 like that previously described, is mounted to slide in a guideway 40 in the top wall of the carriage 8 and is arranged with its plunger 21 bearing against the contiguous side of the arm 33. Guideway 40 extends parallel to the surface of arm 33 on which the plunger bears, and the indicator is held frictionally in the guideway by a clamp 41 in sliding engagement with a stud 42 which protrudes from the bottom of the indicator casing. A spring 43 is engaged with the head of the stud 42 and with the clamp 41 so as to press the latter against overlying shoulders 44 at each side of the guideway.

Movement of the indicator along its guideway places the contact point of the plunger at points along the arm 33 variously distant from the fulcrum point of spring 39, whereby the movement imparted to the indicator pointer pursuant to a given displacement of the master gear can be varied in proportion to the pressure angle of the test gear. A scale mounted on the carriage and overlying the plunger guide sleeve 22 bears graduations 45 which, by reference to an index mark on the sleeve 22, establishes the location of the indicator at which the movement imparted to its plunger will be equal to the backlash of a test gear having a given pressure angle, or proportional to the backlash. In the scale here shown, the graduations beside which the numerals 10, 20 and 30 are placed show the positions for indicating backlash of gears of 10°, 20° and 30° pressure angles, respectively. The graduation marked CD designates the position of the indicator for measuring directly displacements of the center of the master gear.

I claim:

1. An apparatus for measuring backlash of gears, comprising holders for a test gear and a master gear, respectively, one of which holders is movable so as to vary the distance between the centers of gears mounted on the respective holders in mesh one with the other, a distance indicator having a movable plunger and means actuated by said plunger for showing distance measurements, and motion transmission means between the movable holder and plunger including a member carried by the movable holder and having a cam surface in pressure transmitting and receiving relation to the plunger, said member being angularly adjustable to place its cam surface at various inclinations to the path in which the member moves when the holder is displaced.

2. An apparatus for measuring backlash of gears, comprising holders for a test gear and a master gear, respectively, one of which holders is movable so as to vary the distance between the centers of gears mounted on the respective holders in mesh one with the other, a distance indicator having a movable plunger and means actuated by said plunger for showing distance measurements, and motion transmission means comprising a conversion shaft carried adjustably by the movable holder having a cam surface arranged to be set by adjustments of the shaft at various inclinations to the path in which the conversion shaft is moved with movements of the holder, said surface being arranged to impart movement to the plunger in various ratios to the movement of the transmission member according as said surface is variously inclined to the path of its movement.

3. An apparatus for measuring backlash of gears, comprising holders for a test gear and a master gear, respectively, one of which holders is movable so as to vary the distance between the centers of gears mounted on the respective holders in mesh one with the other, a distance indicator having a movable plunger and means actuated by said plunger for showing distance measurements, a transmission element carried by the movable holder having a displacement surface adjustable to various angles to the path in which it travels when the holder is displaced, and a lever having an arm bearing on said surface for displacement thereby in a direction transverse to the before named path and a second arm engaged with the plunger to move the latter when the first arm is so displaced.

4. An apparatus for measuring backlash of gears as claimed in claim 13, wherein said means to vary the ratio of movement transmitted by said lever comprises said indicator being adjustably mounted relative to the lever for locating the point of engagement between the plunger and lever at different distances from the fulcrum of the lever.

5. An apparatus for measuring backlash of gears comprising a base, a fixture on said base having means for supporting a gear rotatably, a carriage mounted on the base to move in directions toward and away from said fixture, a holder pivotally mounted on said carriage having means for holding a gear rotatably with its axis at a distance from the pivot of the holder and in position for movement toward and away from the gear holding means of said fixture, said pivotally mounted holder having an outwardly extending portion, a conversion member rotatably mounted on said portion having a cam face adjustable by rotation of the member so as to be placed at different inclinations to the path in which it is movable by angular movement of the holder, an indicator mounted on the carriage including relatively movable index and scale elements and an actuator therefor, and a lever mounted on the carriage having an arm engaged with said actuator and a second arm engaged with said cam face.

6. An apparatus for measuring the backlash of gears, comprising a base, holders on said base for a gear to be measured and a master gear, respectively, one of which holders is movable so as to vary the distance between the centers of gears mounted on their respective holders in mesh one with the other, a backlash measuring indicator having a movable plunger and means actuated by said plunger for showing backlash measurements, a scale carried on said base, graduations calibrated on said scale showing the pressure angle of gears to be measured and motion transmission means between said movable holder and plunger adapted to cause movement of the plunger when the holder is moved, said motion transmission means including a lever fulcrumed on said base and means cooperating with said scale to vary the ratio of movement transmitted by said lever between said movable holder and said plunger as determined from the pressure angle of the gear being measured.

7. An apparatus for measuring backlash of gears comprising a base, a fixture on said base having means for supporting a gear rotatably, a carriage mounted on the base to move in directions toward and away from said fixture, a holder pivotally mounted on said carriage having means for holding a gear rotatable with its axis at a distance from the pivot of the holder and in position for movement toward and away from the gear holding means of said fixture, said pivotally mounted holder having a portion which extends to a greater distance from its pivot than the distance between such pivot and the axis of the gear supporting means thereof, a scale carried on said base, a backlash measuring indicator mounted on the carriage including relatively movable index and scale elements and an actuator for imparting movement to one of said elements, transmission means between said pivotally mounted holder and said actuator, said transmission means including a lever mounted on said base independently of said holder and an adjustable connection coacting with said lever and located between said holder and said actuator to vary the motion transmitting ratio of said lever, said adjustable connection being so constructed and arranged to cooperate with said scale so as to be variable in accordance with the pressure angle of the gear to be measured.

8. An apparatus for measuring backlash of gears comprising a base, a fixture on said base having means for supporting a gear rotatably, a carriage mounted on the base to move in directions toward and away from said fixture, a holder pivotally mounted on said carriage having means for holding a gear rotatable with its axis at a distance from the pivot of the holder and in position for movement toward and away from the gear holding means of said fixture, said pivotally mounted holder having a portion which extends to a greater distance from its pivot than the distance between such pivot and the axis of the gear supporting means thereof, a scale carried on said base, graduations on said scale showing various pressure angles of gears to be measured, a backlash measuring indicator mounted on the carriage including relatively movable index and scale elements, an actuator for imparting movement to one of said elements, a lever having an arm engaged with said actuator to impart motion thereto and a second arm in motion receiving relation with the outwardly extending portion of the pivotally mounted holder, and means to vary the motion transmitting ratio of said arms in accordance with the setting of said scale.

9. An apparatus for measuring backlash of gears comprising a base, a fixture on said base having means for supporting a gear rotatably, a carriage mounted on the base to move in directions toward and away from said fixture, a holder pivotally mounted on said carriage having means for holding a gear rotatable with its axis at a distance from the pivot of the holder and in position for movement toward and away from the gear holding means of said fixture, said pivotally mounted holder having a portion which extends to a greater distance from its pivot than the distance between such pivot and the axis of the gear supporting means thereof, a scale carried on said base, graduations calibrated on said scale to show plurality of pressure angles, a backlash measuring indicator mounted on the carriage including relatively movable index and scale elements and an actuator for imparting movement to one of said elements, transmission means between said pivotally mounted holder and said actuator, said transmission means including a lever mounted on said base independently of said holder and an adjustable connection to vary the ratio of motion transmission of said lever between said holder and said actuator, said adjustable connection being constructed and arranged so as to be variable in accordance with the pressure angle of the gear to be measured as determined from the setting of said scale.

ARTHUR I. BEAN.

References Cited in the file of this patent
UNITED STATES PATENTS

| Number | Name | Date |
|---|---|---|
| 1,184,399 | Wheeler | May 23, 1916 |
| 1,222,392 | Green et al. | Apr. 10, 1917 |
| 1,257,483 | Hart et al. | Feb. 26, 1918 |
| 1,390,432 | Douglass | Sept. 13, 1921 |
| 1,554,646 | Olson | Sept 2, 1925 |
| 1,564,589 | Laessker | Dec. 8, 1925 |
| 2,190,961 | Webber | Feb. 20, 1940 |
| 2,447,445 | Widen | Aug. 17, 1948 |

FOREIGN PATENTS

| Number | Country | Date |
|---|---|---|
| 555,624 | Germany | July 25, 1932 |
| 608,163 | Germany | Jan. 18, 1935 |

OTHER REFERENCES

Gages, Gaging & Inspection, Hamilton, page 266, The Industrial Press, New York, 1918.

Machinery, July 1925, page 888.